United States Patent [19]

Boutemy et al.

[11] 4,440,020

[45] Apr. 3, 1984

[54] WELL LOG DEPTH ZONING

[75] Inventors: Yves L. Boutemy, Houston, Tex.; Henry N. Edmundson, West Reddington, Conn.

[73] Assignee: Schlumberger Technology Corporation, New York, N.Y.

[21] Appl. No.: 364,201

[22] Filed: Apr. 1, 1982

[51] Int. Cl.³ .............................................. E21B 49/00
[52] U.S. Cl. ........................................ 73/152; 364/422
[58] Field of Search ........................ 73/152; 324/323; 340/853; 364/422; 367/25, 86

[56] References Cited

U.S. PATENT DOCUMENTS 4,312,040  1/1982  Tinch et al. ........................ 364/422
4,346,593  8/1982  Howells et al. ...................... 73/152

OTHER PUBLICATIONS

Southwick, S. H. et al., Digital Computer . . . Logs, Paper No. SPE711 for 38th Annual Fall Meeting of Soc. of Petroleum Engineers of AIME, 1963.
Testerman, J. D., A Statistical Reservoir-Zonation Technique, J.P.T., Aug. 1962, pp. 889–893.
Kulinkovich, A. E. et al., The Location . . . Computers, Prikl. Geofiz. (Russian), No. 39, pp. 107–113, 1964.

*Primary Examiner*—Jerry W. Myracle

[57] ABSTRACT

Disclosed is a well logging process of finding depth zones within each of which a number of logs are mutually consistent within a respective selected tolerance. Logs which have good vertical resolution, for example the porosity logs, are used to zone a depth interval, and thereafter logs which have poorer vertical resolution, such as basic resistivity logs, are divided into the same zones. The zones can be used, as non-limiting examples, to rectangularize the logs and thus reduce probable noise components thereof; to crossplot by zone rather than by depth level, and thus again reduce probable noise in crossplots; to speed up procedures which utilize large vertical segments of logs by using therein zones of constant measurement level rather than measurements for each individual depth levels; and for studies of sedimentary depositions and inter well fitting and recalibration.

25 Claims, 17 Drawing Figures

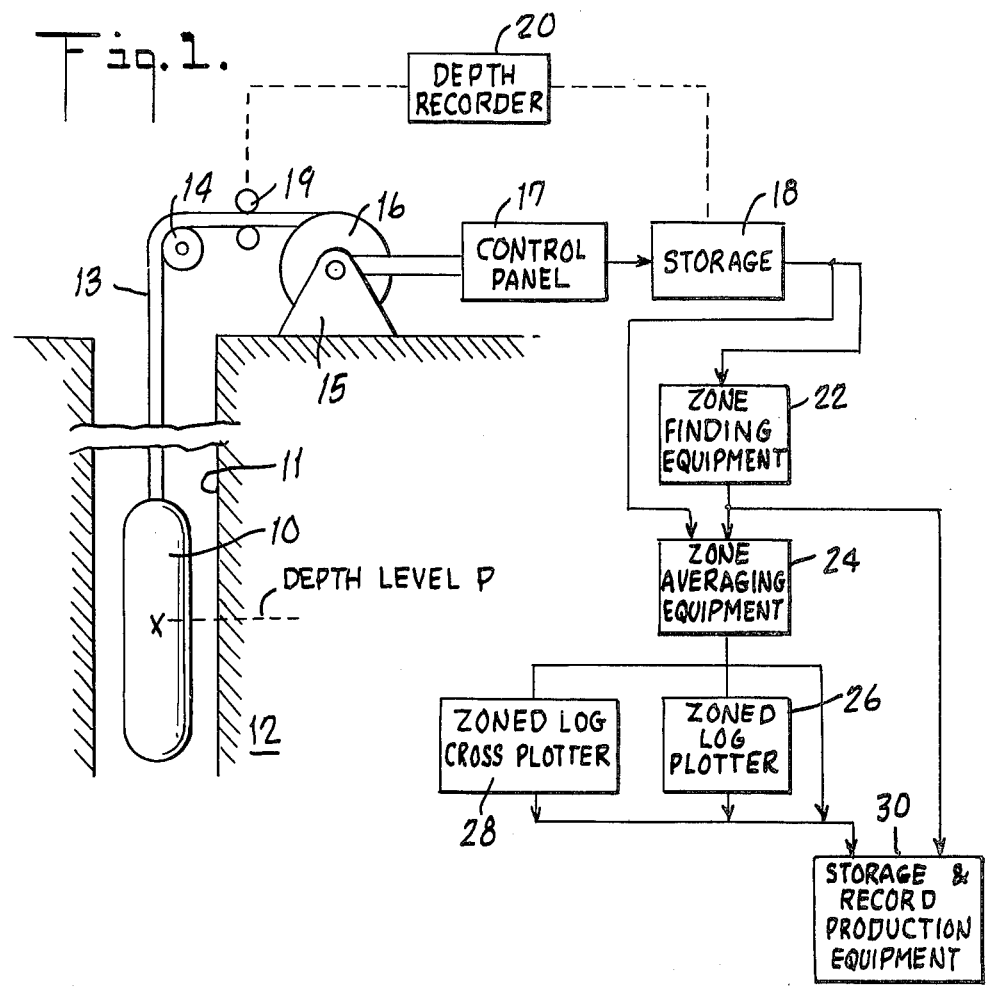
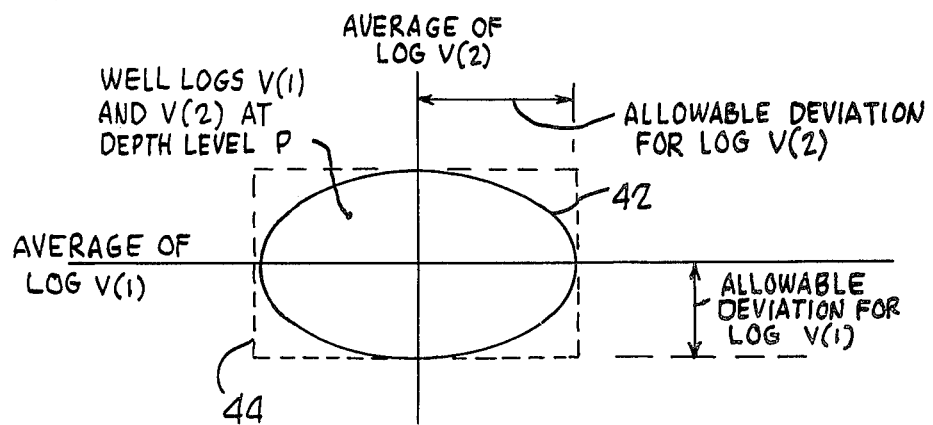

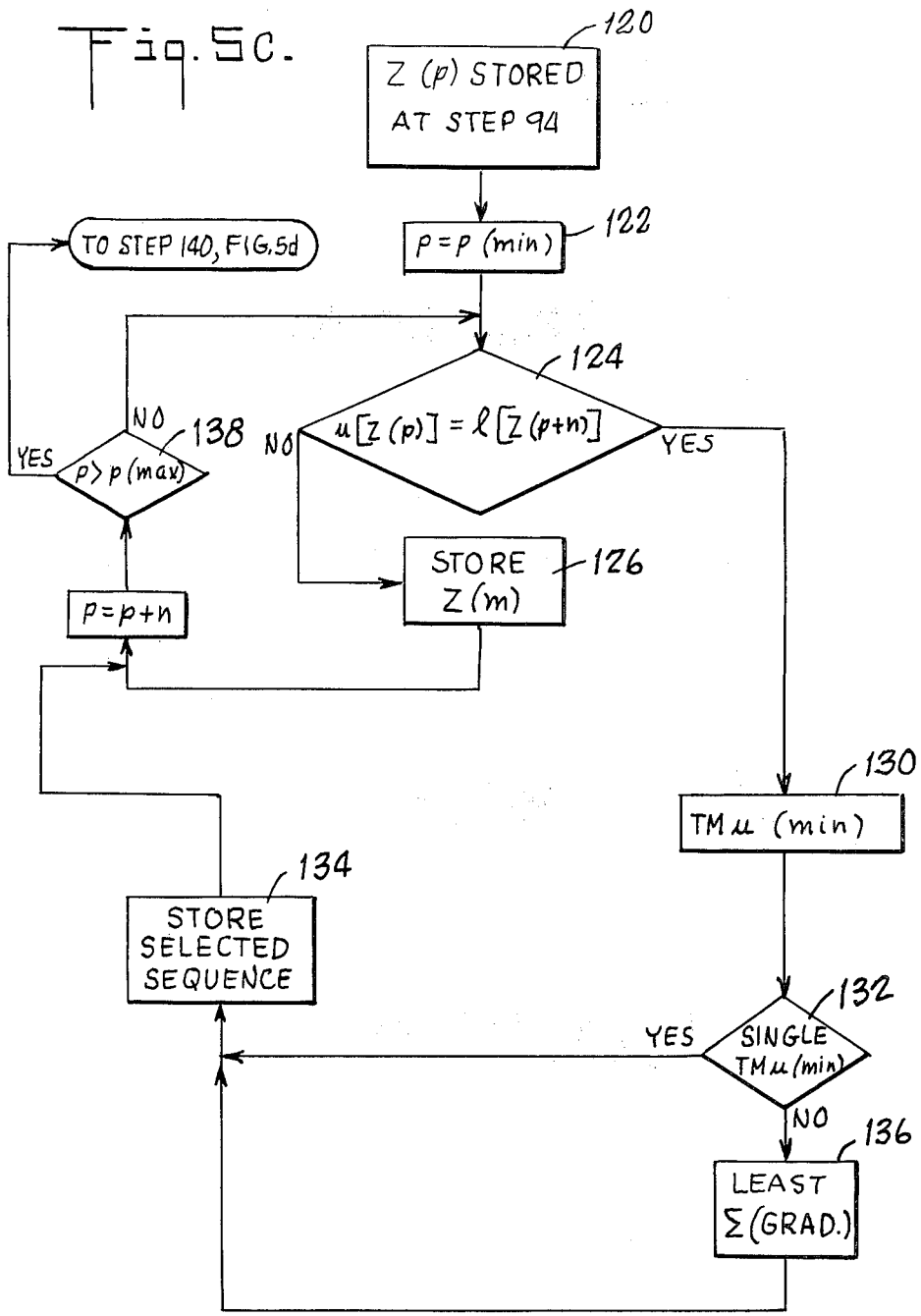

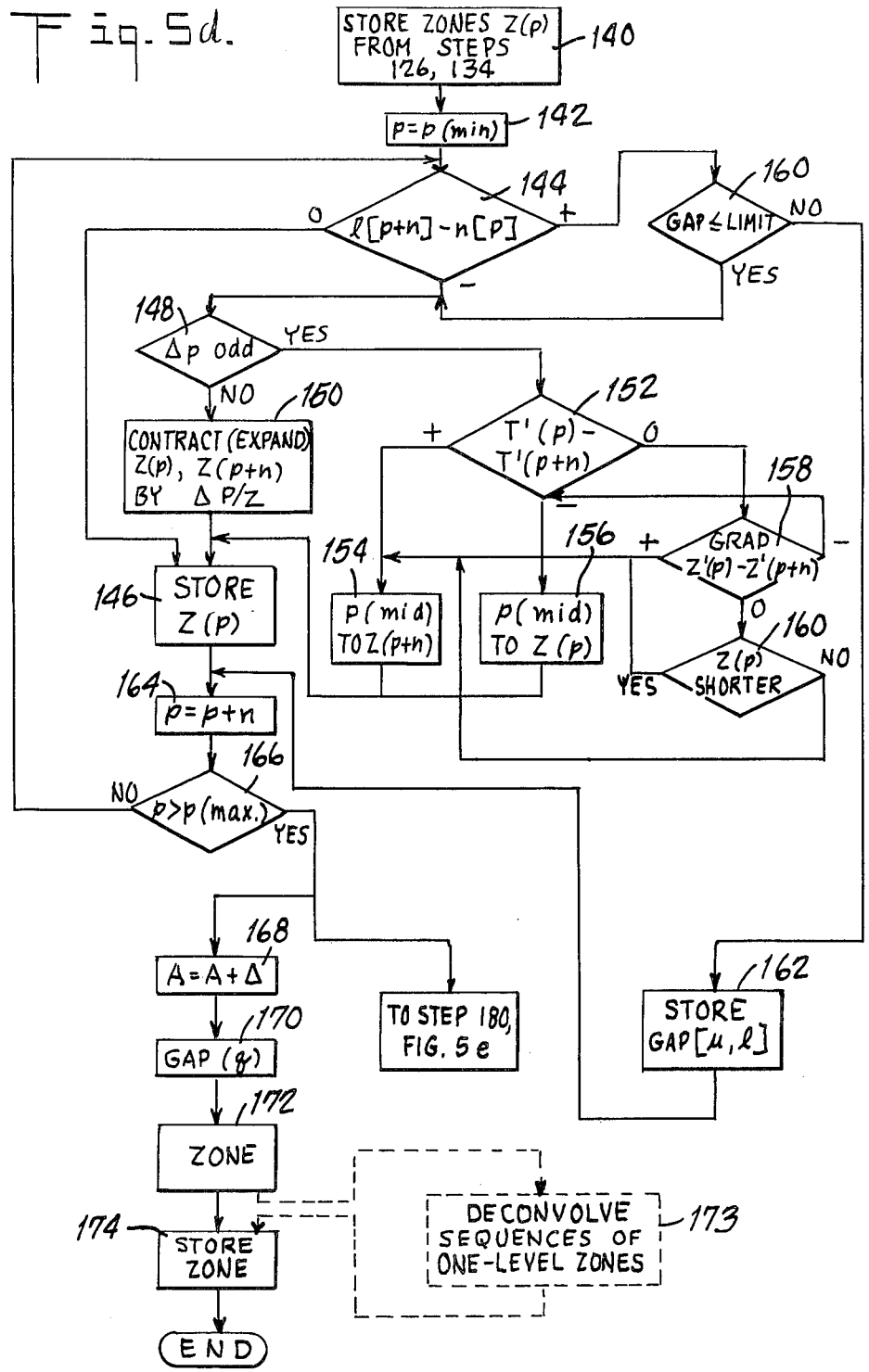

WELL LOG DEPTH ZONING

BACKGROUND AND SUMMARY OF THE INVENTION

The invention is in the field of well logging, in which measurements taken in one or more boreholes by one or more tools drawn therethrough are used in the search for valuable underground resources, such as oil and gas, and concerns finding depth zones consistent with the logged naturally occurring bedding of geological formations and making use of such depth zones. Zoning in accordance with the invention involves finding subsurface depth zones within each of which a number of logs have a respective selected mutual consistency.

It has been proposed to rectangularize or zone individual logs by identifying transitions in an individual log which are believed to be consistent with transitions between beds of the logged geological formations. See, e.g., U.S. Pat. application Ser. Nos. 019,917 now Pat. No. 4,314,338; 019,918 now Pat. No. 4,340,934; 019,925 now Pat. No. 4,314,339 and 019,926 now Pat. No. 4,313,164 filed on Mar. 12, 1979 and assigned to the assignee of this application. Also see Southwick, S. H. et al, Digital Computer Programming For Automatic Analysis Of Well Logs, Paper No. SPE711, to be presented at the 38th Annual Fall Meeting of the Society of Petroleum Engineers of AIME in New Orleans, October 6-9, 1963; Testerman, J. D., A Statistical Reservoir-Zonation Technique, J.P.T. August, 1962, pp. 889-893; and Kulinkovich, A. E. et al, The Location Of The Layer Boundaries And The Differentiation Of Sandstones According To Electrical Logging Data With The Use Of Digital Computers, Prikl. Geofiz. No. 39, pp. 107-113, 1964 (in Russian, with abstract in English attached).

As opposed to typical prior art proposals which emphasize changes in a single log and/or individual log measurements taken at individual depth levels, the invention relies on emphasis on the degree of consistency not only between the measurements of a single log at the depth levels within a given depth zone but also on the consistency between such measurements for several logs for the same zone. By way of an example, if density is the subsurface parameter of interest, a typical prior art emphasis would be in ensuring, to the extent possible, that the density at a given depth level is exactly 2.60 gm/cm$^3$. This may indeed be important if the formation in the immediate neighborhood of the particular depth level was so isotropic as to share the same exact density. In contrast, the invention herein makes use of the realization that the more likely situation is that there is some random anisotropy and that it is more important to determine that the average density of, say, a four foot depth zone of the formation is 2.61 gm/cm$^3$.

In accordance with an embodiment of the invention, a fundamental assumption is made that the logged geological formation is made up of layers and that the logged parameters do not change significantly within a given layer. With this in mind, the described embodiment identifies and makes use of depth zones within each of which a given set of logs have a respective selected mutual consistency.

In a particular embodiment, a number of well logs are generated for a common subsurface depth interval. This interval may be the depth of a logged borehole, a portion thereof, or a portion or all of additional boreholes which traverse the same or substantially similar formations. The logs preferably have relatively good vertical resolution: for example, they can be the porosity logs characterized by a vertical resolution of, say, two feet, as opposed to, say, basic resistivity logs which can have a vertical resolution of, say, in excess of four or five feet. For convenience, the preferably higher vertical resolution logs used in the zoning procedure are referred to as "active" logs, and the zones found on the basis thereof are used later to rectangularize "passive" logs, but it should be understood that some or all of the so rectangularized passive logs may have been used earlier as active logs.

Mutually depth-matched portions of the active logs are combined with each other to find subsurface depth zones within each of which the logs have a respective selected mutual consistency. A premise of this aspect of the invention is that a log measurement at a given depth level is consistent with a given zone if it fits within a permissible uncertainty tolerance with all portions of several active logs for the depth levels within the zone. For a given tool, the permissible uncertainty can be considered to be the combination of the probable standard deviation of the actual measurements taken thereby and a chosen acceptable lithological variation. The probable standard deviation can be found in laboratory tests or it can be arbitrarily chosen, and the acceptable geological variation can be arbitrarily chosen or it can be based on some independently derived knowledge of the geology of the logged subsurface formations.

In one particular example, the process starts with a provisional zone consisting of a single depth level and provisionally expands it by successively adding thereto adjacent depth levels for as long as the log portions within the so expanded zone retain said selected mutual consistency. For example, either or both of the depth levels immediately below and immediately above the provisional zone are provisionally added thereto depending on the relative fit thereto, and either or both or none are kept in the so expanded provisional zone depending on whether the depth levels in the expanded zone retain the respective selected mutual consistency. After the process is repeated starting with each successive depth level in the logged depth interval, the result is that each such depth level is associated with a respective provisional zone which can consist of one or more depth levels and which can have the same depth limits as the zone associated with one or more different depth levels. Following the elimination of zones which are not recognized by enough of their constituent depth levels (e.g., when less than half of the depth levels within a zone are associated with the same upper and lower zone depth levels, the remainder still typically comprises some zones which are completely included within other zones of greater depth extent and some zones which are mismatched in that two zones overlap or two depth-adjacent zones are separated from each other by a gap. Sequences of such mismatched zones are located and a test is run to determine which, if any, subset of the zones within such a sequence best covers the depth span of the sequence, and only the zones within such a subset are kept. Any remaining overlaps and any gaps which are within a selected gap limit are resolved by dividing the depth levels within an overlap or such a gap between the adjacent zones through the use of a procedure which tends to ensure best fit between the so divided depth levels and the zones into which they are included. After this, the remaining zones either match up, i.e., one zone starts where another ends, or adjacent zones are separated by a gap greater than the gap limit. An attempt can be made to reconsider the large gaps by relaxing the selected mutual consistency standards (i.e., increasing the permissible uncertainty) and attempting to zone the depth interval of each large gap in accordance with the procedure discussed. The end result for the entire logged subsurface depth interval is a sequence of matched zones the vertical extent of each of which is typically several depth levels but could be a single depth level.

The active and any passive logs for the common depth interval can be converted to rectangularized logs on the basis of the so found zones such that each log has a respective constant measurement level within each respective zone. In one example, this rectangularization can rely on averaging the relevant log measurements within the relevant zones. If the log has only one maximum or minimum situated near the center of the zone, then the average can be boosted toward the peak value in accordance with a procedure which is believed to reflect the geological and other influences on log measurements in such zones. When the active and/or passive logs show rapid and large variations in a relatively small depth interval, i.e., when the average zone length is approximately the same as the vertical resolution of the relevant log, this typically results in a sequence of one-depth-level zones which exhibit monotonic changes and can be selectively deconvolved into a lesser number of acceptable zones. For example, a sequence of one-level zones can be eliminated by assigning the upper half of its depth levels to the zone above and the remainder to the zone below the sequence.

A tangible record of selected parameters of the so found zones is produced; as nonlimiting examples: by producing such a record of the rectangularized active and/or passive logs, by producing one or more crosplots in which a crossplot point is determined by zone parameters for individual depth levels of two or more logs, such crossplot points including, optionally, an analog visual indication of the depth extent of the zones determining the particular point; by plotting zones in several different ways; and/or by storing selected zone parameters.

Rectangularization of logs based on zones found in accordance with the invention tends to eliminate noise components of the relevant logs and thereby clarify the significance of the log measurements. Crossplots produced from zoned logs tend to have more useful contents and less noise than crossplots based on individual depth levels, and tend to facilitate identifying trends of the relevant subsurface formations. Procedures using logs to find other subsurface parameters, which are not susceptible to being logged directly, tend to be speeded up and simplified when they use zones rather than individual depth levels. As another nonlimiting example, zones found in accordance with the invention assist in making additional subsurface measurements, such as in the introduction of stationary measuring devices, for example induced spectroscopy tools, at the optimal location for such tools, for example the approximate center of a zone. Still in addition, the use of active logs of good vertical response to zone a subsurface depth interval makes it possible to zone and thereby sharpen the vertical response of logs from tools which inherently have relatively poor vertical response.

BRIEF DESCRIPTION OF THE DRAWINGS

FIG. 1 shows a borehole investigating tool and a block diagram of an exemplary embodiment of the invention.

FIG. 3 illustrates a hyper-ellipsoid test for acceptability of a depth level with respect to a zone.

FIGS. 5a through 5f are a flow chart illustrating process steps of an exemplary embodiment of the invention.

DETAILED DESCRIPTION

Figure 2:
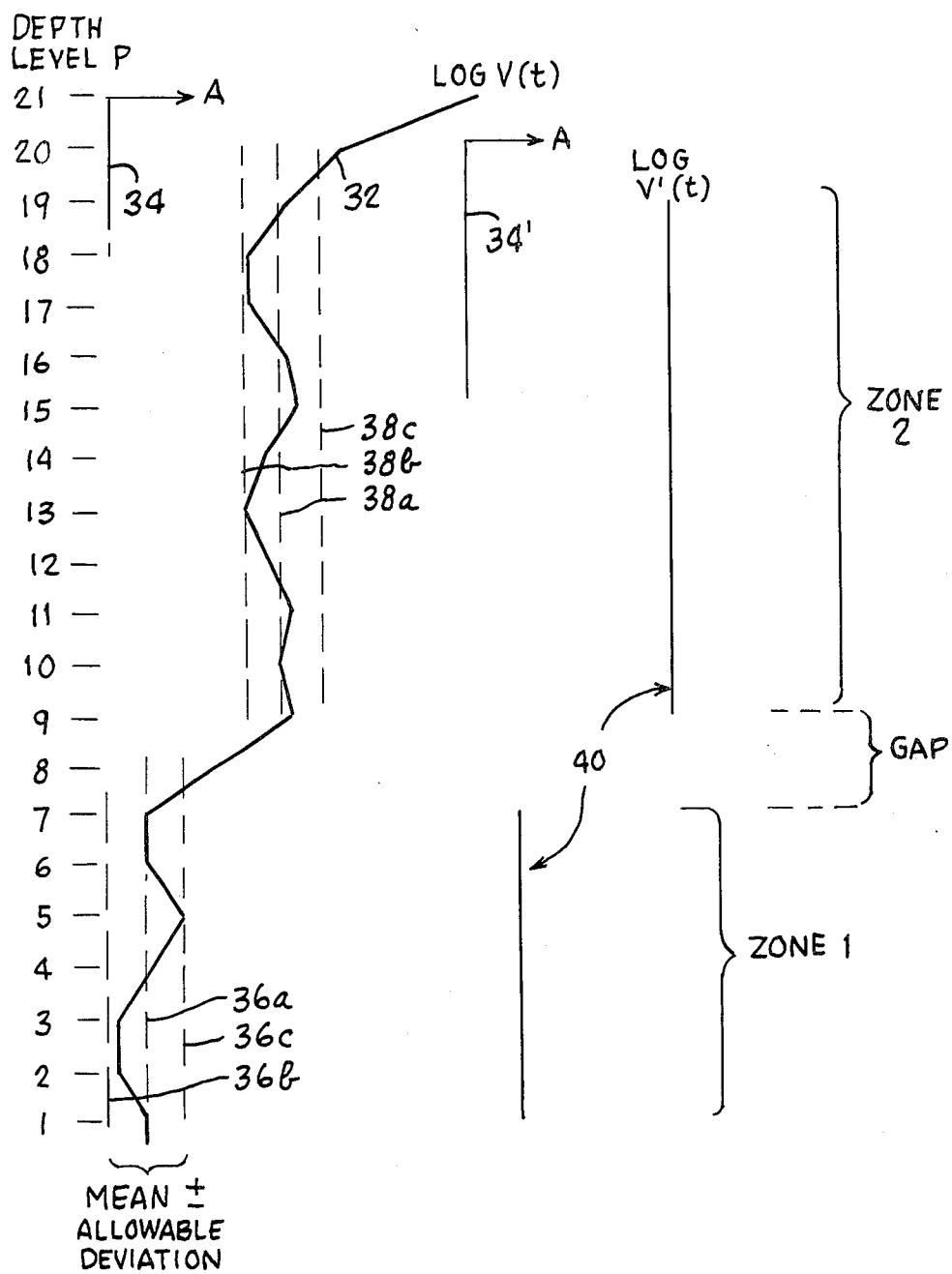
FIG. 2 illustrates a trace of a log derived from the tool illustrated in FIG. 1, and possible zones into which the log trace can be divided.

FIG. 1 shows an investigating tool 10 in a borehole 11 for investigating subsurface earth formations 12 by deriving one or more well logs thereof. Tool 10 is supported in borehole 11 by a cable 13 which passes over a sheave wheel 14 and is secured to a drum and winch mechanism 15. Mechanism 15 includes a suitable brush and slipring arrangement 16 for providing electrical connections between conductors within cable 13 and a control panel 17. Panel 17 supplies power and control signals to tool 12 by cable 13 and includes suitable electronic circuitry for receiving well logging measurements from tool 10 and readying them for application to storage 18. Storage 18 can include equipment for converting analog signals received from tool 10 into digital signals associated with the respective depth levels p in borehole 11 at which the analog signals have been derived by tool 10, as indicated by wheel 19 which engages cable 13 and is linked with depth recorder 20, which in turn is linked with storage 18. Storage 18 can include additional equipment for preprocessing of well logs, such as, optionally, deconvolution, interlog depth-alignment, etc. Storage 18 can store well logs derived by separate measuring devices carried by the same tool 10 in one pass through borehole 11, logs derived from separate passes of tool 10 through borehole 11, and/or logs derived from passes of tool 10 or other similar tools through different boreholes in the same or similar subsurface formations. When needed, storage 18 generates a number of well logs which are for a common subsurface depth interval and applies them to zone finding equipment generally indicated at 22, which combines mutually depth-matched portions of the logs with each other to find subsurface depth zones within each of which the logs have a respective selected mutual consistency. The same logs used by zoning equipment 22, as well as possible additional logs from storage 18, are supplied to zone averaging equipment 24, together with relevant parameters of the zones found by equipment 22, and equipment 24 converts the logs supplied thereto to rectangularized logs each of which has a respective constant measurement level within each respective zone. The rectangularized logs provided by equipment 24 can be supplied to: a plotter 26 for producing a tangible visible record of the zoned or rectangularized logs, for example a log trace on paper, film or other medium; a crossplotter 28 for producing a tangible and visible record of crossplots in which each crossplot point is determined by zone parameters rather than parameters for individual depth levels of two or more logs; and/or the zone parameters found by equipment 22, the zone averaged or rectangularized log produced by equipment 24 and the zoned log plots produced by equipment 26 and the zoned log crossplots produced by equipment 28 can be supplied to storage and record production equipment 30 which produces a tangible record of the log parameters supplied thereto, for example in the form of measurable and identifiable signals stored in electronic magnetic film and/or visible traces on paper, film or other media.

Referring to FIG. 2 for a simplified illustration of some aspects of the invention, log v(t) indicated by log trace 32 is derived from a tool t (where t designates either a separate tool 10, or an individual one of several measuring devices carried by the same tool 10) and is made up of measurements each taken at a respective one of depth levels p which extend through a subsurface depth interval from 1 through 21. The amplitude of each measurement is indicated by the distance of the relevant point on trace 32 from a baseline 34. It is apparent in this simplified example that log trace 32 has only a small variation in a zone 1 which extends from about depth level 1 to depth level 7 and in a zone 2 which extends from about depth level 9 to depth level 19. Considering these zones, the average of the log measurements can be represented by line 36a in zone 1 and line 38a in zone 2, and the deviation limits can be represented by lines 36b and 36c in zone 1 and 38b and 38c in zone 2. If the indicated deviation limits can be considered allowable, then it is likely that the log measurements in zone 1 result from a subsurface layer of acceptably constant geological characteristics and those in zone 2 result from another subsurface layer of other acceptably constant geological characteristics. If this premise is correct, then log v(t) can be converted to a rectangularized log v'(t) which can be represented by trace 40 and has a constant measurement level in zone 1 and another constant measurement level in zone 2. The gap between depth levels 7 and 9 is not considered at the moment.

In this simplified example, the log measurement at a given one of depth levels 1 through 7 is acceptable in zone 1 because its deviation from the mean or average in zone 1 is within an allowable deviation. Stated differently, if a given log measurement taken by tool t at depth level p is designated v(t,p) and the average of the measurements of the same log tool t in a given zone is designated v(t)av, then that measurement is acceptable with respect to that zone if the following inequality is satisfied, in which the right hand side represents the permissible uncertainty u(t) for tool t for the log measurements whose average is v(t)av: $|v(t,p)-v(t)av| \le u(t)[v(t)av]$. The permissible uncertainty for a given tool can be considered to be the combined effect of the probable standard deviation of an actual measurement taken by that tool and a chosen acceptable lithological variation. The first term can be accounted by establishing for each given tool of interest a function s(t)[v(t)], expressing for tool t the standard deviation for a log measurement v. The second term can be considered to be a constant g(t) which can be chosen depending on the likely geological variability in the logged formation, so that the total acceptable uncertainty for tool t and log measurement v therefrom can be expressed as:

$$u(t)[v(t)] = \{s(t)[v(t)] \times r(t)^2 + g(t)^2\}^{\frac{1}{2}} \qquad (1)$$

where r(t) is a constant called the relative tolerance and is normally set to unity and serves, when necessary, to balance the role of the tool measurement uncertainty with the lithological variation. Particular values for the function s(t) can be established by measuring the actual response of a given tool when passing it through a formation of known characteristic, for example in a laboratory. As a specific example the relevant value for the function s(t) for a Schlumberger Limited tool designated SNP at temperature of 200° F., mudweight 10 lb/gal and caliper of 8 inches, for the indicated log measurements and time constant deconvolution are as follows:

| log measurement | T-C Deconvolved s(t) | τ = 2 s(t) |
|---|---|---|
| 0 | .0043 | .0021 |
| .1 | .0113 | .0056 |
| .2 | .0201 | .0101 |
| .3 | .0305 | .0153 |
| .4 | .0423 | .0212 |
| .5 | .0554 | .0278 |

The example of FIG. 2 is simplified and it is, of course, for a single log v(t), while the invention finds zones within a number of logs are mutually consistent rather than zones within which a single log is within an allowable deviation window. Therefore, in accordance with the invention a given depth level is acceptable with respect to a given zone if the mutual average of all of the relevant logs at the given depth level is within a permissible uncertainty window of the mutual average of the log measurements of all of the logs for all of the depth levels within the zone.

Referring to FIG. 3 for a graphic example of mutual consistency of two logs, the horizontal axis represents the average of a first log v(1) within a given zone, the vertical axis represents the average of a second log v(2) for the same zone, and the allowable deviations for logs v(1) and v(2) for the same zone are also indicated. In this example, a given depth level p is acceptable with respect to the zone for which the averages and allowable deviations are indicated if the measurements of v(1) and v(2) for that given depth level p are within the indicated ellipse of 42. Note that rectangle 44, which represents the individual acceptabilities of the measurements of logs v(1) and v(2) with respect to the individual tolerance windows for those logs can also be used, but that ellipse 42 is preferably used in the invention. Of course, in the typical actual practice of the invention the ellipsoid test illustrated in FIG. 3 for two logs is in fact extended to n dimensional space where n designates the number of active logs used in zoning and can be three, four, five, etc. Stated in terms of of an expression, a depth level p is acceptable with respect to a given zone if a test function T satisfies the following inequality where $\vec{v}$ designates the collection of measurements for the several logs at depth level p, $\vec{v}(av)$ represents the hyper-ellipsoid mutual average within the zone, v(t,p) represents the measurement for log t at the depth level p of interest, v(t)av represents the average measurement of log t within the zone of interest, the denominator represents the permissible uncertainty for the measurements of log t with respect to the average measurement for that log within the zone of interest, and A represents an absolute tolerance which can be arbitrarily selected and is preset to, for example, unity. The expression is generalized for the case of n different logs, where n is a positive integer.

$$T[v, v(av)] = \sum_{t=1}^{n} \left( \frac{v(t,p) - v(t)av}{u(t) [v(t)av]} \right) \leq A \quad (2)$$

The expression immediately above is generalized for the case of n different logs, where n is a positive integer.

Figure 4:
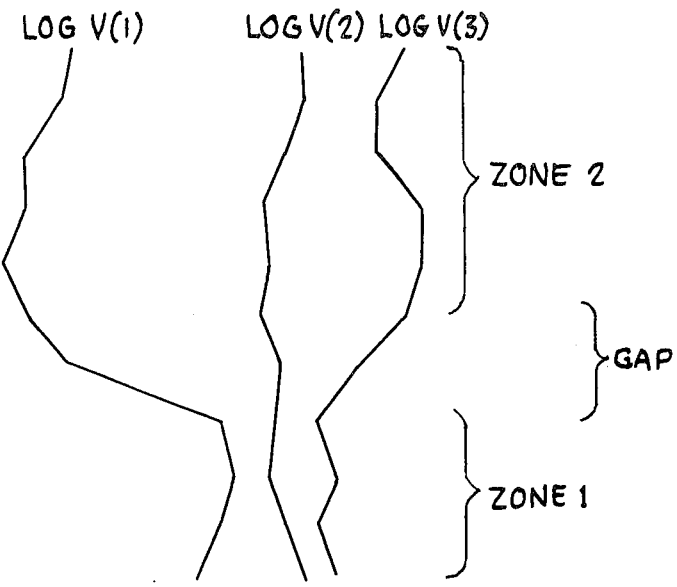
FIG. 4 illustrates the traces of three logs and two possible zones thereof.

Referring to FIG. 4 for a graphic example showing traces for logs v(1), v(2) and v(3), the hyper ellipsoid test could indicate that there is a gap between the illustrated zones 1 and 2 despite the fact that log v(2) appears to be reasonably steady within the gap.

A particular example of a computer-implemented process embodying the invention is illustrated in FIGS. 5a–5f where block 50 designates the contents of a storage device such as device 18 in FIG. 1 which stores and can provide on demand two or more well logs v(t) each of which comprises a respective measurement v(t,p) for each respective level p, where p ranges from 1, at the bottom of the depth interval to be processed, through P at the top. For the steps discussed below, assume that logs v(t) are preferably "active" logs, i.e., logs which preferably have relatively good vertical resolution. At step 52 a depth index piece p is set to one, to start at the bottom of the common subsurface depth interval of interest, which would typically be the bottom depth level in a borehole, and at step 54 the upper limit u and lower limit l of a provisional zone are set to p, to thereby define the upper and lower depth limits of a starting provisional zone whose depth extent at this time is only one depth level. At step 56 the average log measurement is found for the provisional zone separately for each of the active logs, so that the collection of log measurements at another level can be checked for consistency with the combination of average measurements found at step 56. The average measurement can be simple mean or arithmetic average; for example it can be the sum of the measurements of a given log t at the depth levels within the interval between upper limit u and lower limit l divided by the number of depth intervals in the zone. The following expression is one example of relating the average measurement of a log v(t) for a zone between limits u and l to the measurements v(t,p) for the individual depth levels p in the zone:

$$v(t)av[u,l] = \frac{1}{u - l + 1} \sum_{p=1}^{u} v(t,p) \quad (3)$$

At this time the zone is only one depth level thick and therefore the average measurement is simply the measurement for the given log at the bottom level of the borehole interval of interest. At step 58 a test is made to see if the top of the borehole has been reached and at step 60 another test is made to see if the procedure has extended below the bottom level of the interval of interest. In the first run through step 58 the answer would be negative, because the procedure is at the bottom level of the borehole of interest, but at step 60 the answer would be positive because the level below the bottom level in the interval of interest is, of course, outside the interval of interest. Accordingly, at step 62 the depth index p is incremented by one, to move one depth level up in the borehole depth interval of interest, and the lower boundary of the provisional depth zone is also incremented by one depth level, and the procedure returns to step 56, which now finds the average measurement of each of the active logs for the provisional zone which is one depth level thick and is at the second depth level from the bottom up in the borehole depth interval of interest. The tests at steps 58 and 60 now lead to step 64, in which the test function discussed earlier in connection with expression 2 is found separately for the depth level immediately above and the depth level immediately below the current provisional zone with respect to the average log measurements within the current provisional zone. At step 66 the two test functions for the respective depth levels are compared, for example by subtracting them from each other and checking if the result is positive, negative or zero. A negative result means that the depth level immediately above the current provisional zone has a better relative fit to the zone than the level immediately below and should be provisionally added to the zone. Conversely, a positive result means that the level immediately below the current provisional zone has a better relative fit thereto and it, rather than the level immediately above, should be added provisionally to the provisional zone. A zero result means that the two levels of interest have equal relative fit, and both should be provisionally added to the current provisional zone. Depending on the outcome of the test at step 66, the procedure goes to one of steps 68, 70 and 72 to provisionally expand the current provisional zone by adding thereto, respectively, only the depth level immediately above the current provisional zone, both depth levels immediately above and immediately below, or only the depth level immediately below. Next, at step 74 the average measurement for each respective log is found for the new, provisionally expanded zone, which has upper limit u' and lower limit l' found in one of the steps 68, 70 and 72, for example in accordance with the procedure discussed in connection with expression 3 above. At step 76 a test is made to check if the portions of all of the active logs of interest within the entire new, provisionally expanded zone between limits u' and l' have the requisite mutual consistency. In this test at step 76 each measurement for a depth level of an active log is tested with respect to the average measurements found at step 74 for the provisionally expanded zone, by the procedure discussed in connection with expression 2 above, to determine if the test function found therefor is less than or equal to the absolute tolerance A. If the test at step 76 yields a positive result, the provisionally expanded zone is permanently expanded by setting its upper and lower depth limits to the provisional limits u' and l', and the procedure returns to step 56. It is noted that the average log measurements which need to be found at this time in step 56 have already been found at step 74, and use may be made thereof. If the test at step 76 yields a negative result, this means that the provisionally expanded zone is not valid because the log portions therein do not have the requisite mutual consistency. Accordingly, the zone just prior to the attempt to expand it is the valid one, and this zone—defined by depth limits u and l rather than by depth limits u' and l' —is stored at step 80. The depth index p is then incremented at step 82, a test is made at step 84 to ensure that the procedure is still within the depth interval of interest, and if so, the procedure returns to step 54, which defines a new starting provisional zone which is at the new depth level set in step 82.

When the procedure discussed above in connection with steps 50 through 84 has proceeded through all of the depth levels of the borehole depth interval of interest, step 80 has stored, for each depth level p in the interval of interest, parameters defining a corresponding zone which has at least two characteristics of interest: the portions of the active logs of interest which are within the upper limit u and lower limit l of the zone have the requisite respective selected mutual consistency, and the depth level p is within those depth limits. A convenient technique is to store, for each depth level p, seven parameters as follows: (1) an identification of the depth level p, (2) an identification of the lower depth limit l of the zone, (3) an identification of the upper depth limit u of the zone, (4) a measurement for the zone gradient (discussed below), (5) an indication of whether the zone is acceptable or has been rejected (derived in tests discussed below), (6) an indication of the absolute tolerance A used in defining the zone, and (7) an index marker.

Accordingly, at the end of the procedure discussed above, step 80 has stored an identification of as many zones as there are depth levels in the borehole interval of interest (except, possibly, for the lowermost depth level), and typically some of those zones have identical upper and lower depth limits, some are totally included within other zones of greater depth extent, some overlap with each other and some are zones consisting of a single depth level.

When the test at step 58 or step 84 determines that the procedure discussed above has reached the top of the borehole depth interval of interest, the procedure goes to step 86 to commence eliminating zones which should be rejected.

One category of zones which can be rejected is zones which have not been recognized by enough of their constituent depth levels. For example, if each of depth levels 1, 2 and 3 is associated, through the process described above, with a zone having depth level 1 as its lower limit l and depth level 20 as its upper limit u, but none of depth levels 4–20 is associated with that zone, the zone is considered unreliable and is rejected. One way to do this is to check the zones stored at step 80 and reject those which occur less times than half the number of depth levels between their upper and lower depth limits. An exemplary process for doing this is illustrated in the flow chart of FIG. 5b. It starts at step 86 with the seven parameters which were stored at step 84 for each depth level p in the borehole and include an identification of the lower depth limit l of the zone to which each respective depth level p belongs and an identification of the upper limit u of that zone. At step 87 an index i is set to one to point to the first zone, i.e., the zone which was the first one stored at step 80, and a variable B is set to zero. At step 88 the zone which was first stored at step 80 is called, so that its upper and lower borehole depth limits are available, and at step 89 the depth level p is set to the depth level of the lower limit of the zone called at step 88. At step 90 a test is made to determine if the upper and lower limits of the zone to which borehole depth level p belongs are the same as the upper and lower borehole depth limits of the zone called in step 88. If the result is negative, the depth level p is incremented at step 92, to go to the next depth level of the borehole, and a test is made at step 93 to determine if the new depth level is above the upper borehole depth limit of the zone called in step 88. If the result is negative, the process returns to step 90 to check if the new depth level belongs to the same zone called at step 88. If the result of the test at step 90 is positive, i.e. the depth level under consideration belongs to the same zone called at step 88, the variable B is incremented at step 91 to reflect the fact that the depth level checked at step 19d belongs to the zone under consideration (the zone called at step 88). When the result of the test at step 93 is positive, to indicate that all of the depth levels within the depth limits of the zone under consideration have been checked, a test is made at step 94 to determine if more than half the depth levels within the depth limits of the zone under consideration belong to that zone. The test at step 94 determines if the variable B exceeds half the number arrived at by subtracting the borehole depth level of the lower limit of the zone under consideration from the borehole depth level of the upper limit thereof and adding one. If the test at step 94 gives a negative result, meaning that less than half the depth levels within the zone belong to it and therefore the zone is not acceptable, the fifth parameter of that zone is set to minus one at step 95 to indicate that the zone has been rejected. If step 94 yields a positive result, the zone is stored at step 96 in the list of provisionally acceptable zones. After each pass through step 95 or step 96, the process increments the zone index at step 97 and tests at step 98 whether the current index i is greater than the index of the topmost zone in the borehole. If the result is negative, meaning that the index points to an actual zone, the process returns to step 88 to extract the relevant parameters of the new zone identified by the incremented zone index i. A negative result of the test at step 98 means that all zones have been processed to eliminate those which are not recognized by enough of their constituent depth levels, and the process goes to step 100 to commence a new procedure the purpose of which is to eliminate zones which are completely included within other zones of greater depth extent. Only the zones stored at step 96, i.e. the provisionally accepted ones, are considered in the procedure beginning at step 100.

When the test at step 98 determines that the top of the borehole has been reached, the procedure returns, through step 100, to the zone stored at step 96 which is associated with the lowermost depth level, and at step 102 finds whether the current zone under consideration is completely included within another zone of greater depth extent. The test at 102 can consist of checking the upper and lower depth limits of the zone under consideration against the upper and lower limit of every other zone in store 94. In the alternative it can be shortened by checking the upper and lower limits of the zone under consideration only against the upper and lower limits of those zones which are associated with depth levels within n depth levels of that of the zone under consideration, where n can be an arbitrarily selected interger of, say, between 10 and 50. As another alternative the upper and lower depth limits of the zone under consideration can be checked against previously checked zones until a previously checked zone is found whose lower depth limit is below that of the zone under consideration. The checking can then stop when another previous zone is found whose lower limit is below that of the previously found checked zone. If the check at step 102 finds that the zone under consideration is included in another zone, the fifth parameter of the included zone is set to minus one at step 104, to indicate that the zone is rejected. If the test at step 102 finds that the zone under consideration is not included in another zone, the current zone is stored at step 106 in another sequence of provisionally accepted zones. After either of steps 104 and 106, the depth index p is incremented by one at step 108, to point to the zone associated with the next higher depth level. A test is made at step 110 to find if the sequence of zones stored at step 94 includes a zone associated with the current depth index and if it does not, the procedure returns to step 108. When there is a zone associated with the current depth index p, the procedure checks at step 112 whether the current depth index is still within the borehole depth interval of interest and, if so, returns to step 102 to identify and reject any other zones which are completely included within other zones of greater depth index. When the test at step 112 shows that the procedure has reached the uppermost depth level in the borehole level of interest which is associated with a zone in the sequence of zones stored at step 94, the procedure goes to step 120 in FIG. 5c.

Figure 6:
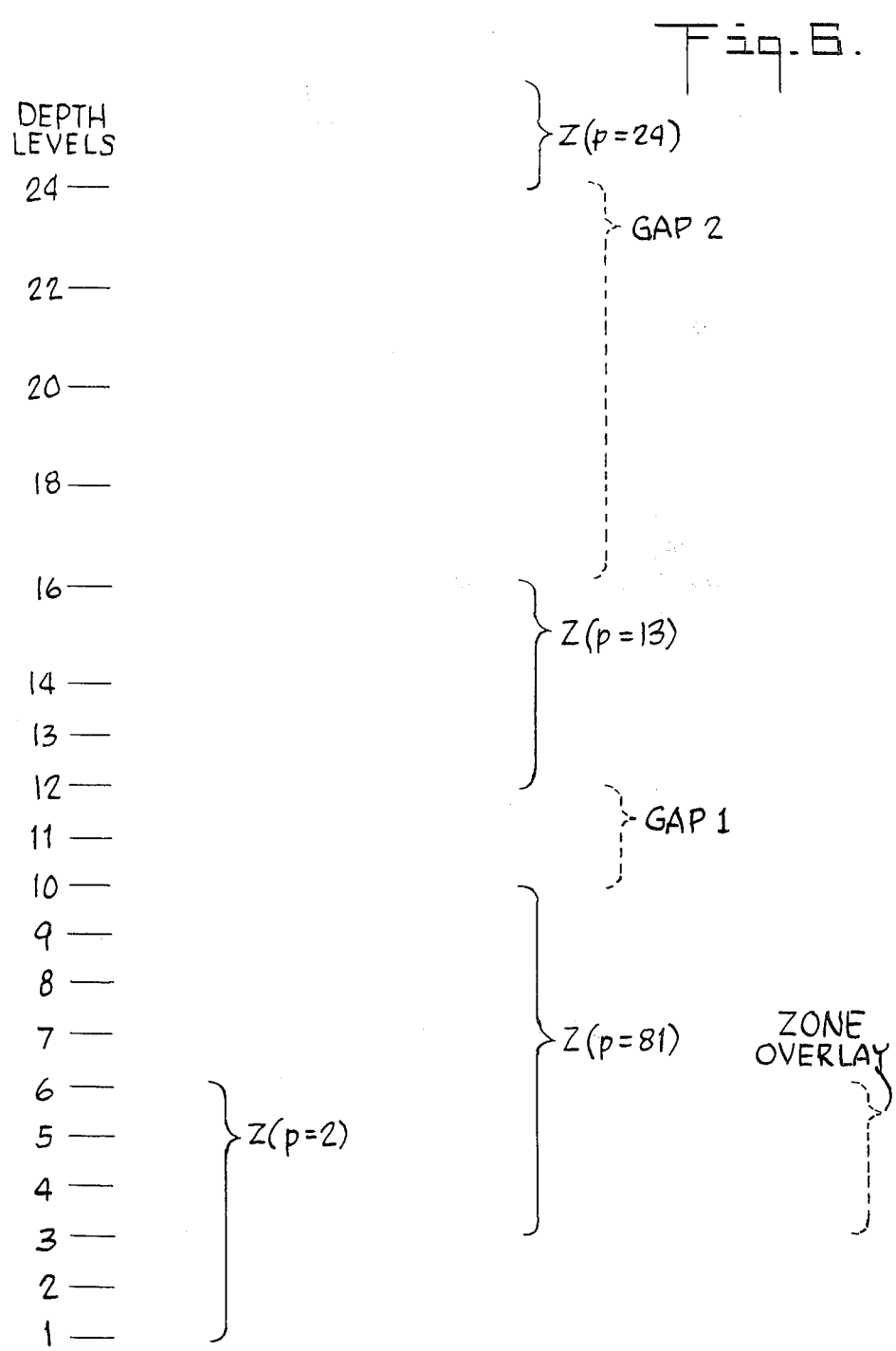
FIG. 6 illustrates the depth extent of several zones and zone overlap and zone gaps.

At this time the sequence of zones stored at step 106 typically includes zones which match up, i.e., as between two adjacent zones one ends where another begins, and zones which mismatch in two ways—either they overlap or they are separated from each other by a gap. This is illustrated in FIG. 6 which shows a zone associated with depth level 2 and a zone associated with depth level 8 which overlap with each other between depth levels 3 and 6, a zone which is associated with depth level 13 and is spaced from the adjacent zone immediately below it by a short gap 1, and a zone which is associated with depth level 24 and is spaced from the zone immediately below by a long gap 2. The purpose of the procedure starting with step 120 is to identify overlaps and gaps and, if possible, rearrange the zones so that they match as well as possible.

Referring to FIG. 5c the procedure starts at step 120 with the sequence of zones stored at step 94 and at step 122 sets the depth level index p to the depth level p(min) associated with a lowermost zone stored at step 94. At step 124 a test is made to determine if the zone associated with the current depth level matches the one associated with the next higher depth level for which a zone was stored at step 94. Specifically, a test is made whether the upper limit of the zone associated with the current depth level under consideration is the same as the lower depth limit of the zone associated with the next depth level for which a zone was stored at step 94. If this test yields a negative result, meaning that the two adjacent zones either overlap or are spaced by a gap, the current zone under consideration is stored at 126 in a store for a sequence m of mismatched zones, the depth index p is incremented to point to the next higher depth level for which a zone was stored at step 94, and the procedure returns to step 124 to seek any other zones to be stored, at step 126, in the sequence of m mismatched zones. When a test at 124 indicates that the current zone under consideration matches the next higher zone, the procedure goes to step 130 to commence an effort to select that subset of the zones stored at step 126 which best covers the relevant depth span.

Thus, step 130 is entered after the procedure at step 126 has stored a sequence of m zones which mismatch in that any two depth-adjacent zones in the sequence overlap each other or are spaced from each other by a gap, and the process operates on this sequence of mismatched zones to find the combination thereof which minimizes a test function TMU. Specifically, if the m mismathced zones stored at step 126 are designated z(1), z(2), ..., z(m), the process seeks an ordered selection (subset) of them z(i,l), z(i,2), ..., z(i,r), where i is a zone index and r is a selected integer for which a test function TMU can be defined as follows:

$$TMU = |l[z(1)] - l[z(i,1)]| + |u[z(m)] - u[z(i,r)]| + \sum_{j=1}^{r-1} |u[z(i,j)] - l[z(i,j+1)] - .5| \quad (4)$$

If the test function TMU is evaluated for every combination of the zones stored at step 126, and if there is a single minimum of the test function, then the ordered selection of zones corresponding to that single minimum of the test function is stored at 134, in the same format as the zones stored at step 120, and the procedure returns to step 128 to seek and treat in similar manner other mismatched sequences. If the test at step 132 determines that they are two minima of the test function, then at step 36 the two ordered selections corresponding to the two minima of the test functions have the sums of their gradients evaluated and the ordered selection having the lesser sum of gradients is stored at 134. The gradient of a zone can be found as the global gradient of the line in n dimensional tool space that best fits in a least squares sense the normalized log measurements in the zone. The term global is used herein to mean the combination of all of the measurements of all of the active logs used to evaluate the zone and n dimensional tool space means space having as many dimensions as there are active zones used in evaluating the zone. Normalization in this context can means altering the log measurements within the zone of interest in accordance with expression 5 below, in which the left hand term refers to the normalized measurement for a given log t at a given depth level p within the zone of interest, v(t) refers to the log measurement at a given depth level in the zone, v(t)av refers to the average measurement within the zone (see discussion in connection with expression 3 above) and the denominator refers to the allowable standard deviation for tool t with respect to the average measurement in the zone of interest:

$$v(t)\text{norm} = \frac{v(t) - (v(t)av}{s(t) [v(t)av]} \quad (5)$$

When a test at step 138 determines that the procedure starting with step 120 has already treated the last zone stored at step 94, a new procedure starts at step 140 (FIG. 5d) whose purpose is to contract overlapping zones so that they match each other and to seek to expand adjacent zones separated by gaps which are within an arbitrarily selected limit. To this end step 140 starts with the zones stored in steps 126 and 134, i.e., typically with the zones from step 126 which match each other as well as with the zones from step 134 which can mismatch despite the fact that only the best ordered sequence subsets were stored at step 134. Thus, the procedure at step 140 still typically starts with provisional zones which can match each other as well as with provisional zones which can mismatch each other by overlapping or by being separated by gaps. At step 142 the depth index b is set to identify the lowermost depth level associated with a zone in the collection stored at step 140, and at step 144 a test is made to determine whether as between two depth-adjacent zones the zones overlap, match, or are separated by a gap. The test can comprise subtracting the upper limit of the current zone under consideration from the lower depth limit of the next higher zone in the listed zones stored at step 140, and testing to find if the result is negative (meaning that the two adjacent zones overlap), zero (meaning that the two adjacent zones match well), or positive (meaning that the two adjacent zones are spaced by a gap). If the two adjacent zones under consideration match, each is stored at step 146 in a new collection of provisionally accepted zones. If the two zones overlap, a test is made at step 148 to determine if the number of depth levels $\Delta p$ which are in the overlapped interval is odd. If this number is even, the overlapped depth levels are divided equally between the two zones under consideration at step 144, i.e. the lower zone $z(p)$ is contracted to drop out of it the upper half of the overlapped interval and the upper zone $z(p+n)$ is contracted to drop out of it the lower half of the overlapped interval. The so contracted adjacent zones $z(p)$ and $z(p+n)$ are stored at step 146. If the test at step 148 determines that the number of depth levels in the overlapped interval is odd, a procedure starts with step 152 to determine which of the two adjacent zones should take the middle one of the depth levels in the overlapped interval. Specifically the procedure at step 152 evaluates two test functions in accordance with the procedure discussed in connection with expression 2, one test function for the zone $z(p)$ if the zone is contracted to exclude the depth levels above the middle depth level of interest, and another test function for the next higher zone $z(p+n)$ if contracted to exclude therefrom the depth levels below the middle depth level of interest. If the test at step 152 shows that the middle depth level of interest p(mid) fits better with the upper contracted zone which would include it, it is added thereto at step 154 and the so contracted zone is stored at step 146. If the test at step 152 shows that the disputed middle point fits better with the contracted lower zone $z(p)$, it is added thereto at step 156 and the so contracted lower zone is stored at step 146. If the test at step 152 shows that the two test functions are equal, a test is made at step 158 to determine the difference between the gradient of the lower zone if contracted to include the disputed middle depth level and the gradient of the upper zone if contracted to include the disputed middle depth level. In case of a positive result from step 158 the procedure returns to step 154, and in case of a negative result it returns to step 156. In case of a zero result from step 158, a further test is made at step 160 to find which of the two zones under consideration is shorter, and the disputed middle depth level is added to the shorter one at the respective one of steps 154 and 156.

If the test at step 144 determines that there is a gap between the adjacent zones under consideration, a test is made at step 160 to determine if the gap is within a selected gap limit, for example whether the gap is no more than, say, four depth levels thick (or some other, arbitrarily chosen depth extent). If it is within the gap limit, the procedure returns to step 148, and thereafter proceeds as discussed above except that at step 150 the two zones flanking the gap are expanded to include the depth levels within the gap rather than contracted to exclude depth levels in an overlapped interval. If the test at step 160 determines that the gap exceeds the gap limit, the gap parameters are stored at step 162 so that the gaps can be treated further if desired. After a provisionally accepted zone is stored at step 146, or a provisional gap is stored at step 162, the process increments at step 164 the current depth index p to point to the next higher zone within store 140, tests at step 166 whether it has treated the highest zone from store 140 and, if not, returns to step 144. If the test at step 166 shows that the highest zone has been treated, a transfer can be made to a procedure for treating gaps under a relaxed acceptable uncertainty in an effort to extract some zones therefrom, or it can go directly to step 180 in FIG. 5e for utilizing the zone parameters stored at step 146.

An effort to extract zones from the gaps stored at step 162 commences at step 168 by relaxing the absolute uncertainty A, and identifies at step 170 the lowermost gap stored at step 162 and attempts at step 172 to find zones within the gap by using the process described above for finding zones within the borehole depth interval of interest. Any zones found at step 172 are stored at step 174, and the procedure is repeated for additional gaps from store 162.

At the conclusion of the procedure discussed in connection with FIG. 5d, step 146 has resulted in the storage of all zones which are either matched or are separated by gaps and, the optional procedure of steps 168 through 174 has resulted in the storage of additional zones characterized by relaxed uncertainty criteria and located in gaps between zones stored at step 146.

Figure 5A:
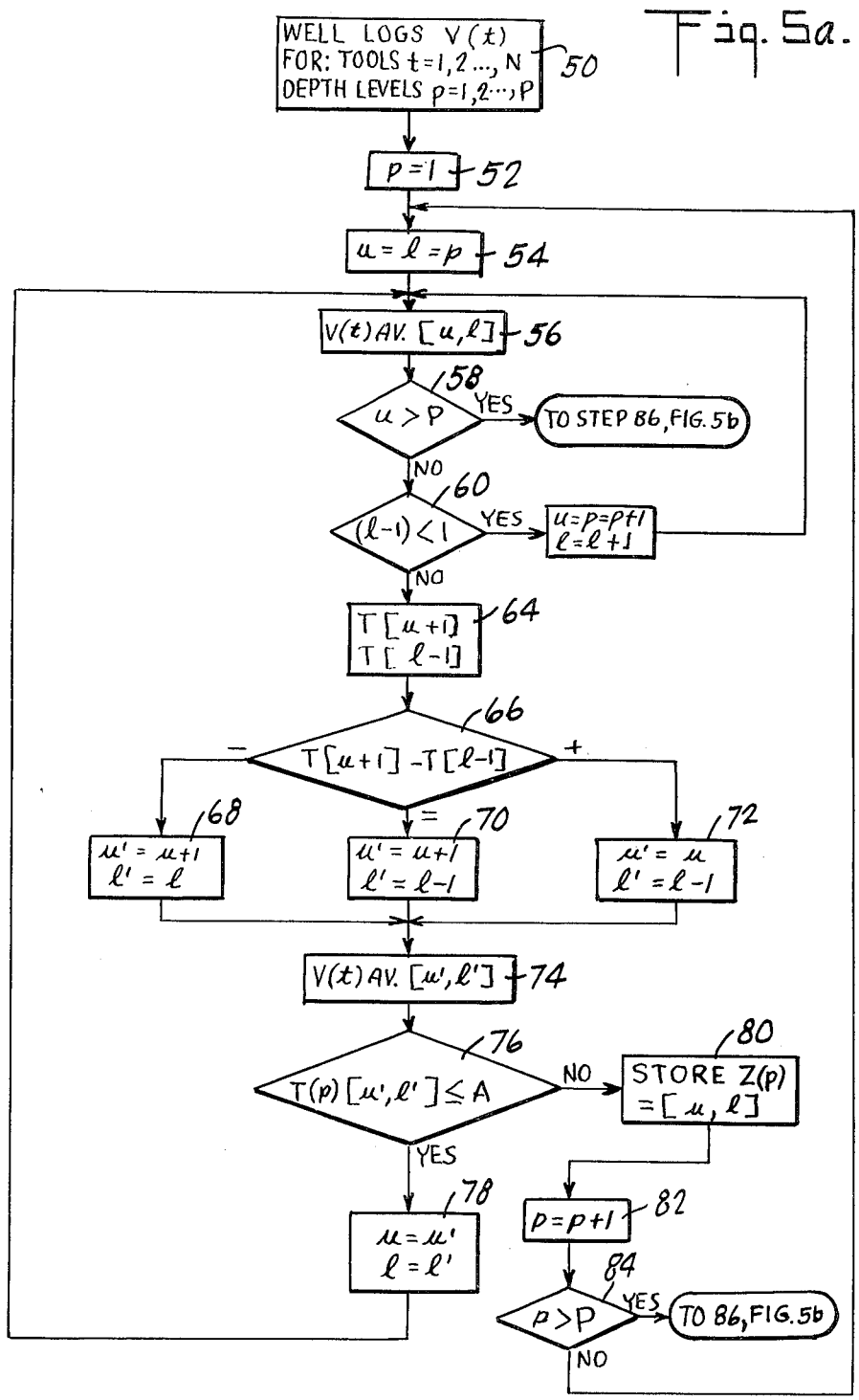
Figure 5B:
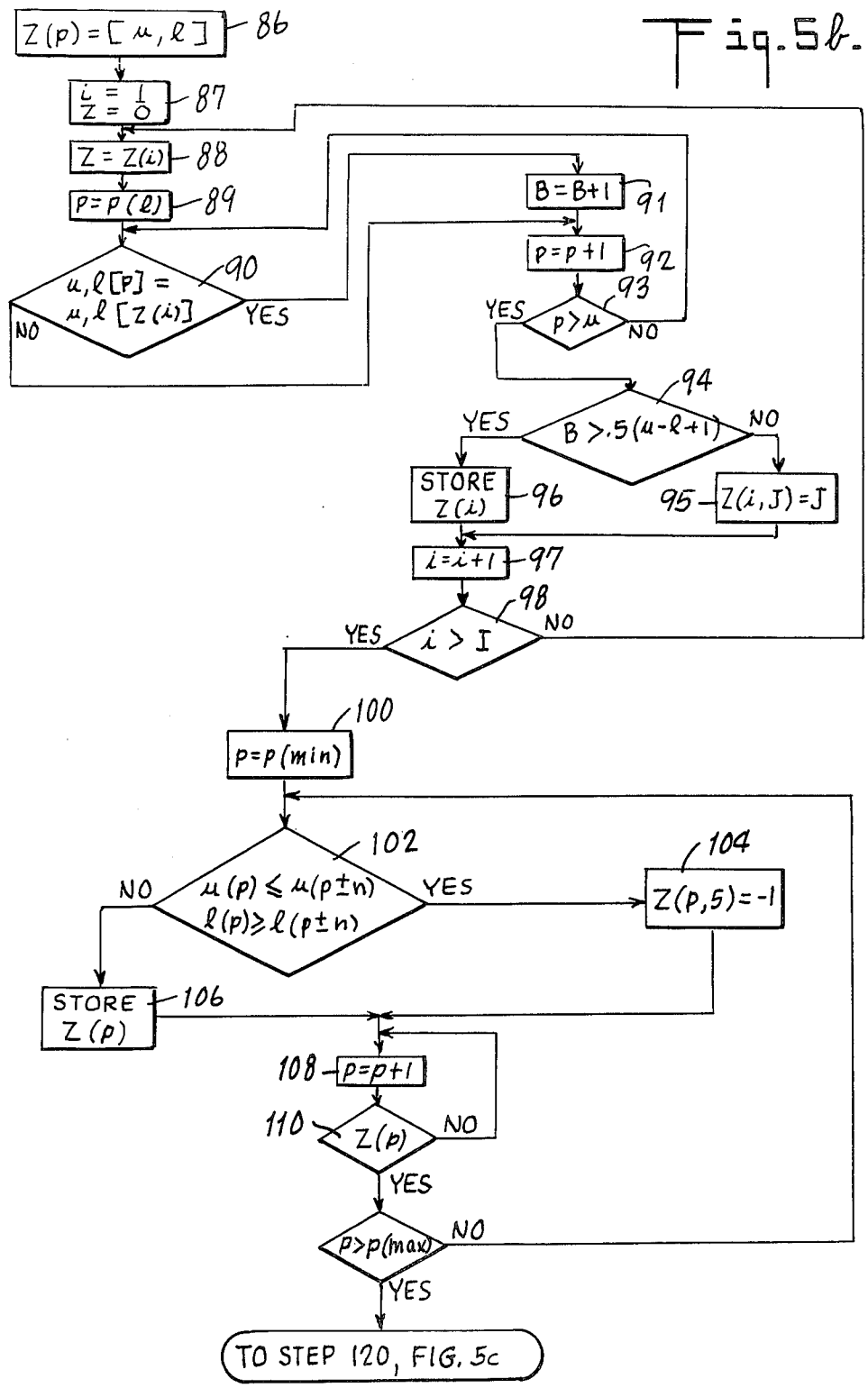
Figure 5E:
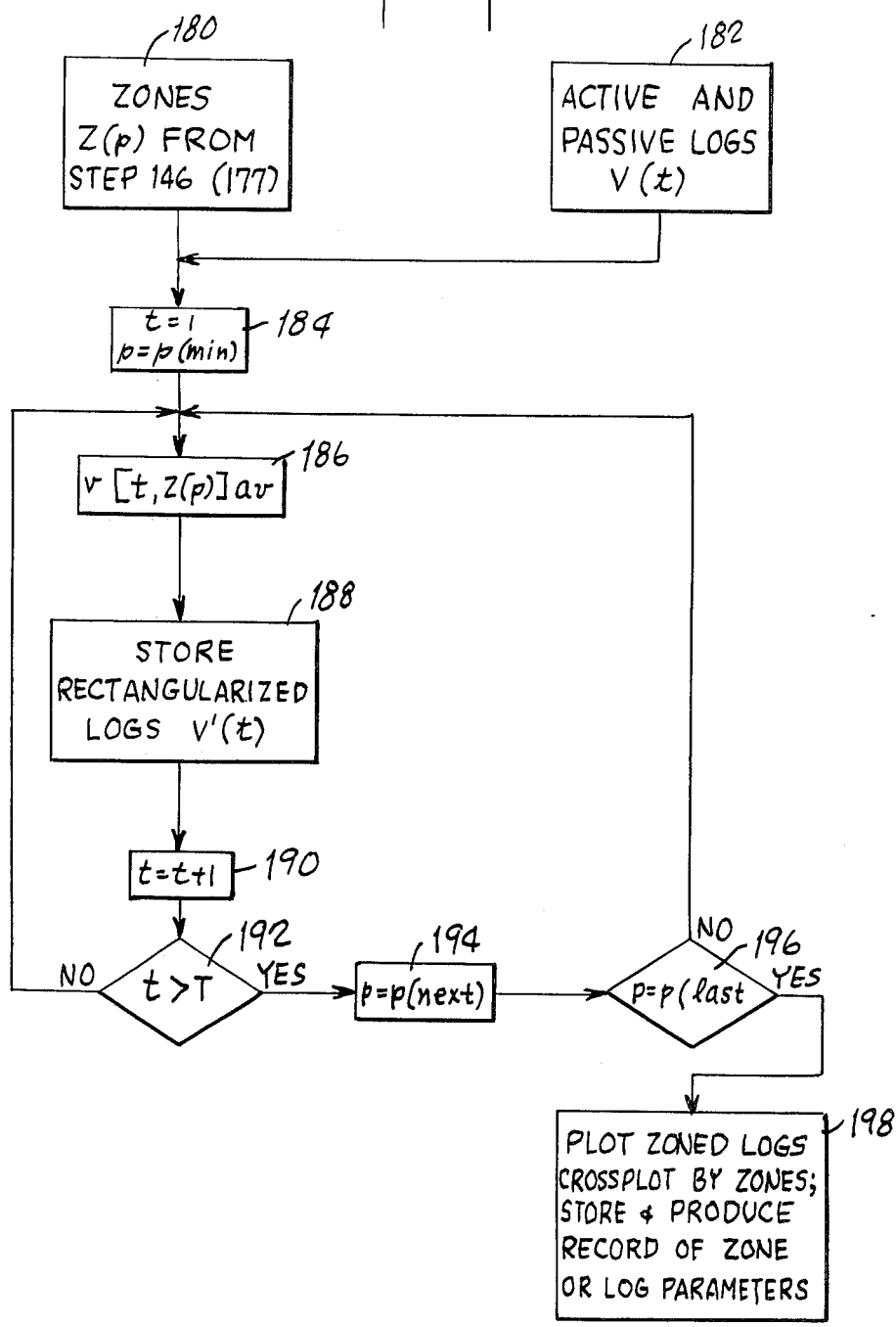

Referring to FIG. 5e for an example of rectangularization of logs based on the zones found as described above, the process starts at 180 with the zones stored at step 146 (and, optionally, at step 177) and at 182 with the active logs $v(t)$ on which the zoning procedure was based as well as any additional, passive logs also designated $v(t)$, and at step 184 sets the index t to point to the first log of interest and set the depth index p to point to the depth level p(min) of the lowermost zone of interest. At step 186 the average measurement of log t within the zone $z(p)$ associated with the current depth level p under consideration is evaluated, for example in accordance with the procedure discussed in connection with expression 3 above, and the so found average measurement is stored as a part of a rectangularized log $v'(t)$ at step 188. At step 190 the index t is incremented to point to the next active or passive log of interest, and if the test at step 192 determines that there are additional logs to be so processed, the procedure returns to step 186; otherwise the zone pointer p is updated at step 194 to point to the next higher zone, a test is made at step 196 to ensure that the zone index point to a zone which is still within the borehole interval of interest, and if so the procedure returns to step 186. When the test at step 196 finds that the uppermost zone has been processed, the rectangularized logs stored at step 188 as well as the zone parameters from step 188 and any needed active and passive log parameters from step 182 are used at step 198 to produce tangible records comprising one or more of plots of one or more zoned or rectangularized logs, crossplots by zone rather than by individual depth levels, and to store and/or produce records of selected zone or log parameters.

Figure 7:
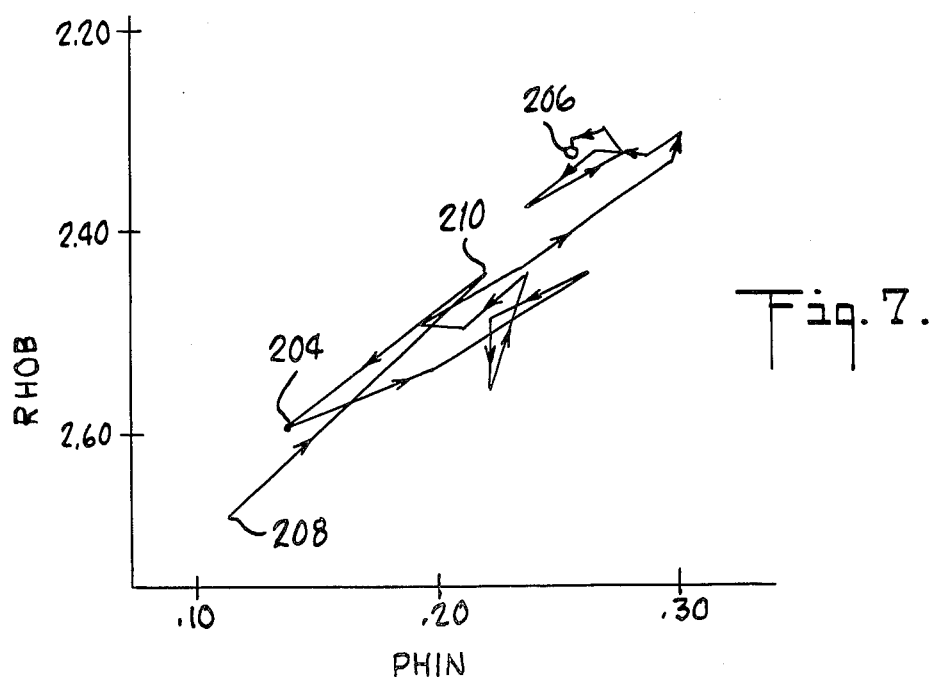
FIG. 7 illustrates a cross plot in which crossplot points are determined by the parameters of respective zones rather than of individual depth levels.
Figure 8:
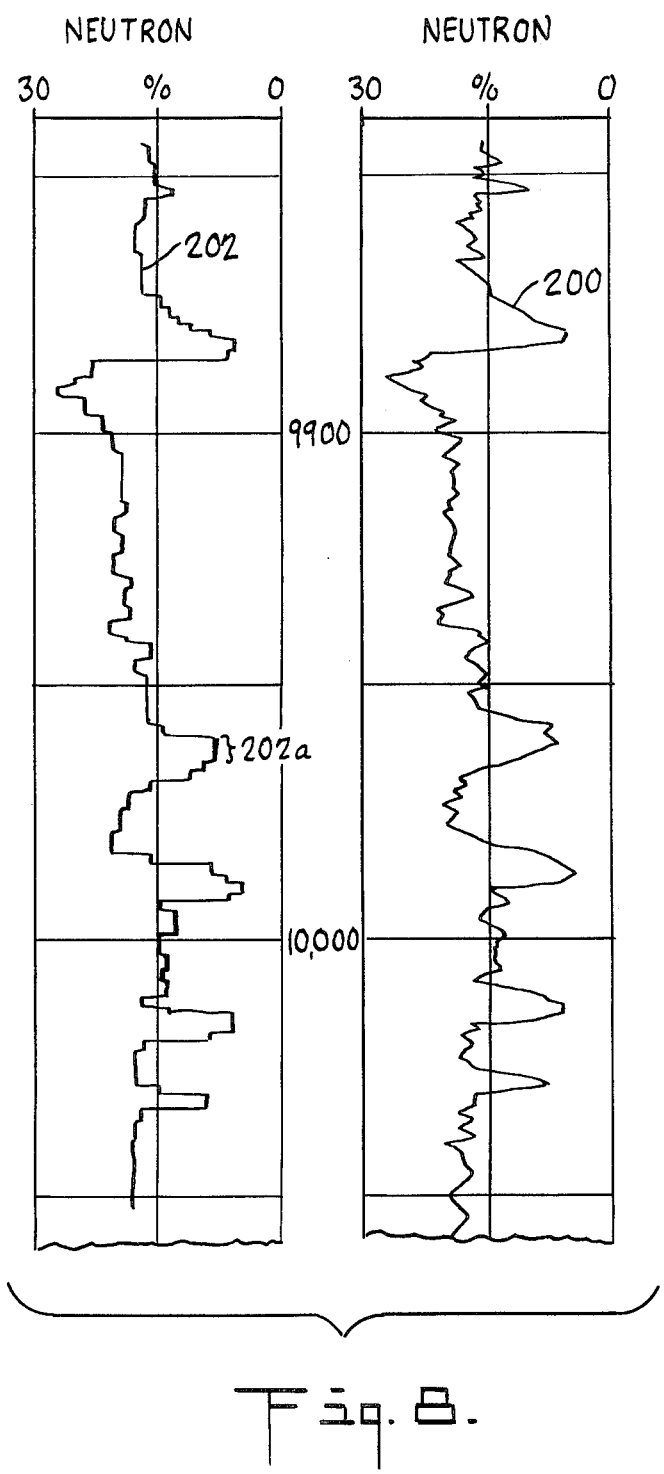
FIG. 8 illustrates the trace of an actual log derived from a borehole and a converted, rectangularized log derived therefrom by practicing the invention.

One example is illustrated at FIG. 7 and another at FIG. 8. The example of FIG. 7 comprises a crossplot in which each crossplot point is determined by zone parameters rather than parameters for individual depth levels of two or more logs. In particular, the horizontal axis of FIG. 7 is for the neutron log and the vertical axis for a density log, where the neutron log is rectangularized in accordance with the process described above and the density log (which results from the combination of several primary logs) is similarly rectangularized. A portion of a neutron log derived from logging an actual borehole is illustrated at 200 in FIG. 8 and the corresponding rectangularized portion is illustrated at 202. By using the constant log measurement for a zone of a log such as the one illustrated at 202 in FIG. 8, for example the constant log measurement at zone 202a thereof, and the log measurement value of the density log for the corresponding zone, a single point on crossplot 7 is fixed. One example of such a point is at 204 in FIG. 7 and is represented by a small circle the size of which is proportional to the depth extent of the zone, and thus serves as an analog visual indication of the depth extent of the zones determining the crossplot point. Another, larger circle is at crossplot point 206 and indicates that the zones producing crossplot point 6 have greater vertical extent than those producing crossplot 204. The fact that no circles are visible at the other crossplot points is indicative of the fact that the zones producing them have low vertical extents. It can be seen that the crossplot of FIG. 7 gives a clearer visual indication of the nature of the formations as compared to a crossplot where each point is determined by the log measurements of two or more logs at a single depth level, and allows visualizing the changes between successive zones. For example, starting at the lowermost zone, which produces crossplot point 208, it can be seen that the zone has relatively low neutron response and relatively high density, that the next zone up, as indicated by the arrow on the line from crossplot point 208 to crossplot point 210, produces crossplot point 210 which has higher neutron level and lower density, that the next higher zone produces crossplot point 204, which has neutron level and density intermediate those of the zones producing crossplot points 208 and 210 but has a greater vertical extent, etc. While the rectangularized log 202 in FIG. 8 and the crossplot in FIG. 7 are specific examples of tangible records of selected parameters of the zones found in accordance with the process described above, it should be clear that other tangible records of such parameters can be produced in other ways, for example by producing visual indications of the relevant parameters on paper, film or other record medium or by storing tangible signals defining such parameters in storage media such as semiconductor or magnetic memory devices.

Figure 5F:
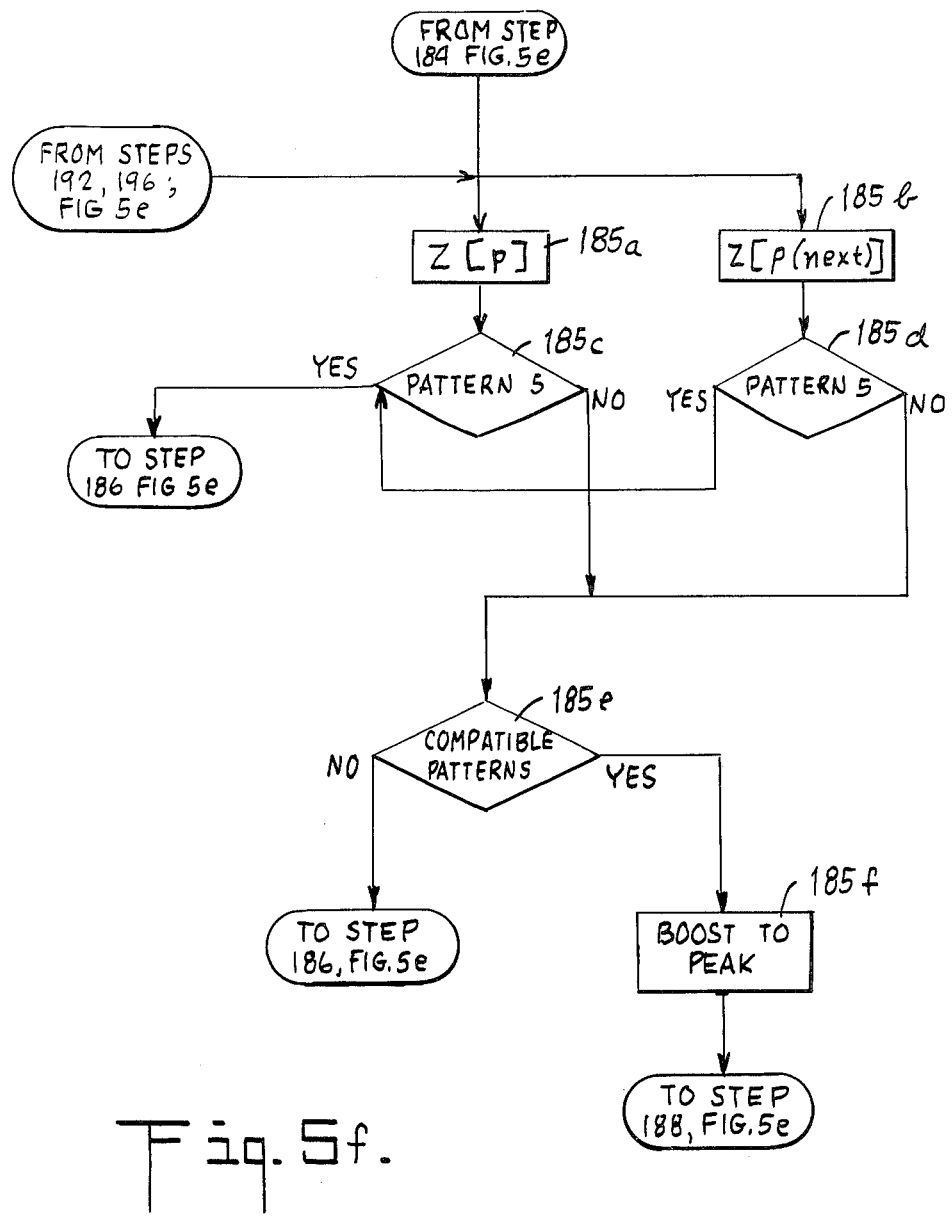
Figure 9:
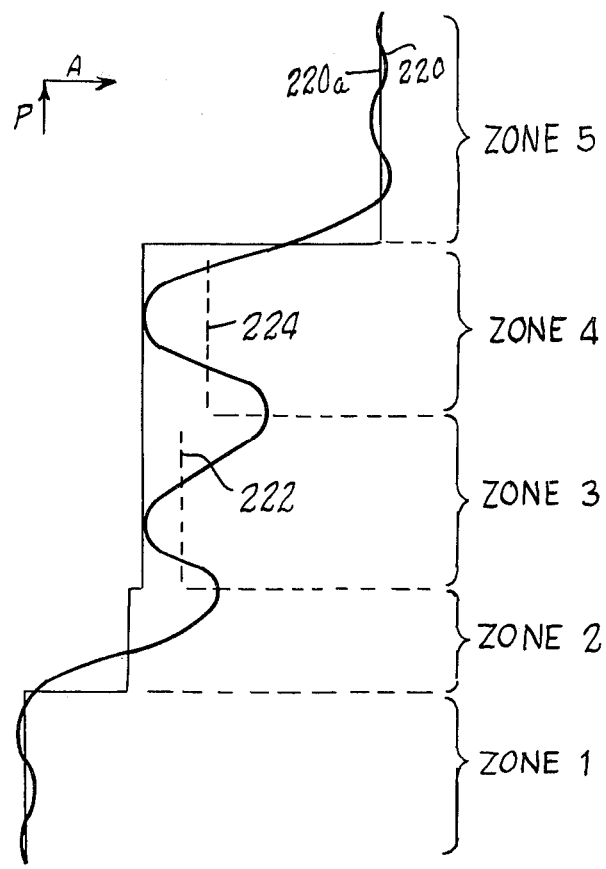
FIG. 9 illustrates a trace of a passive log and a rectangularized version thereof.
Figures 10A, 10B, 10C:
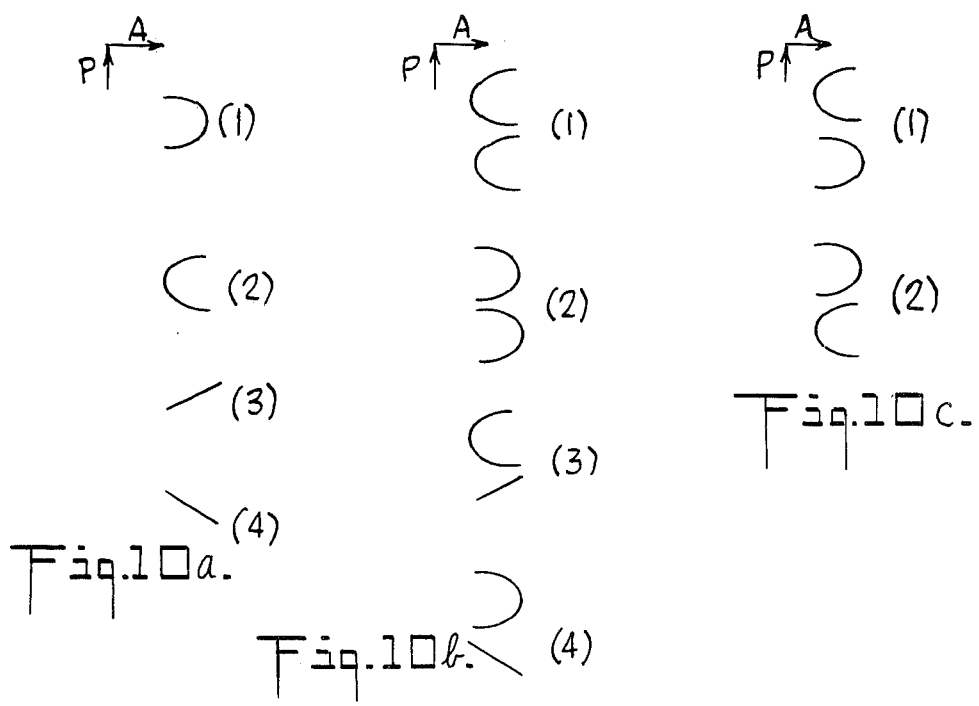
FIG. 10a illustrates several patterns of variation of log measurements within a zone.
FIG. 10b illustrates pairs of incompatible patterns for adjacent zones.
FIG. 10c illustrates two pairs of compatible patterns for adjacent zones.

In connection with step 186 of FIG. 8, it was noted that passive logs are averaged within the zones established on the basis of the active logs, and that this averaging involves finding a respective average measurement of a respective log within a respective zone. As an optional operation, it can be desirable to find zones which contain a single peak (either maximum or minimum) occurring near the center of the zone and to boost the "average" log measurement within the zone to that peak measurement. However, primarily because some logs may be mismatched in terms of depth, which can result in a lack of depth correlation, such boosting may lead to inaccurate results. One example is illustrated in FIG. 9 where trace 220 represents a passive log and trace 220a represents the rectangularized version thereof divided into zones 1 through 5 on the basis of the zones established through the use of active logs. It is immediately apparent that the boundaries between zone 2 and zone 3 and between zone 3 and zone 4 are misplaced, probably because of depth mismatching between log 220 and the active logs on which the zoning is based. It is also seen that each of zones 3 and 4 contains a single peak (a minimum in this case) and that if the "average" is boosted to the peak measurement, this "average" for zones 3 and 4 would not accurately represent the average measurement in the zone, but that the average measurement would be more accurately represented by the level indicated by dashed lines 222 and 224 respectively. For the purpose of determining which zones ought to be boosted and which should not, the process described above can optionally include a procedure for identifying zones which contain a single peak near the zone center, for determining whether the adjacent zone is of a compatible nature and then boosting or not boosting depending on such determination. One example is illustrated in FIG. 5f, where the indicated procedure replaces that discussed in connection with step 186 in FIG. 5e. Specifically, the process illustrated in FIG. 5f starts at steps 185a and 185b with two adjacent zones and determines at respective steps 185c and 185d whether the zone fits a pattern 5. For an illustration of patterns, refer to FIG. 10a which shows a pattern 1 which is a single maximum peak near the center of the zone; pattern 2 which is a single minimum peak near the center of the zone; pattern 3 which is a substantially monotonically increasing log measurement from the bottom up in the zone; and pattern 4 which is a monotonically decreasing measurement. Pattern 5 is any log variation which is not one of patterns 1 through 4. If a determination is made at step 185c and/or 185d that the identified pattern is number 5, this means that clearly no boosting would be required and the zone is passed to step 186 of FIG. 5e for processing as discussed above. If either or both of steps 185c and 185d determine that the zone under consideration corresponds to one of the patterns 1 through 4 of FIG. 10a, a test is made at step 185e to determine if the two patterns identified in steps 185c and 185d are compatible. Pattern pairs which are incompatible are illustrated at 1 through 4 of FIGS. 10b, and if such a pattern pair is found at step 185e, the respective zones are passed to step 186 of FIG. 5e. If the pattern pair is found to be compatible, and compatible pairs are illustrated at 1 and 2 of FIG. 10c, step 185f boosts each to its peak (minimum or maximum, as the case may be) measurement level and the process goes to step 188 of FIG. 5e.

The zones defined as described above may include sequences of one depth level zones in cases where the original logs change very quickly. One choice is to leave the one level zones as they are and treat them as any other zones. Another choice within the scope of the invention is to find sequences of such one level zones and deconvolve them by assigning the upper half of the one level zones to the longer zone above the sequence and the lower half of the one level zones to the longer zone below the sequence. If the sequence comprises an odd number of one level zones, then the one level zone at the center of the sequence can be assigned to, say, the upper longer zone. It has been observed that the sequences of one level zones are typically two to three feet long, which corresponds to the vertical resolution of many tools and, accordingly, it is believed that such deconvolution is consistent with arriving at accurately rectangularized logs. As a precaution, only sequences of one level zones which are less than a certain maximum sequence depth extent, e.g. three feet, can be subjected to deconvolution, and longer sequences of one level zones can be left as they are. The deconvolution described above can be carried out as an optional procedure at step 173 in the process illustrated at FIG. 5d.

The process discussed above can be carried out on a general purpose digital computer of suitable size and configuration, using the appropriate peripheral equipment necessary to carry out the functions discussed above. In such embodiment each step discussed above in connection with FIGS. 5a through 5f is defined by one or a few statements in a high level computer language such as Fortran, on the basis of which the computer equipment is arranged to operate as a special purpose machine carrying out the process described above.

It should be clear that the process described above is only an example of carrying out the invention, and that the invention is not limited to that particular example but includes any other embodiment thereof which is within the scope of the appended claims.

What I claim is:

1. A well logging method comprising:
generating a number of well logs for a common subsurface depth interval;
selecting mutually depth-matched portions of the logs and processing them to find subsurface depth zones within each of which the logs have a respective selected mutual consistency; and
producing a tangible record of selected parameters of said zones.

2. A well logging method as in claim 1 in which the producing step includes producing a tangible record of one or more crossplots in which a crossplot point is determined by zone parameters rather than parameters for individual depth levels of two or more of said logs.

3. A well logging method as in claim 2 in which said record contains, at each crossplot point, an analog visual indication of the depth extent of the zones determining the crossplot point.

4. A well logging method as in claim 1 in which said processing of log portions to find a zone comprises starting with a provisional zone at a first selected depth level and expanding the provisional zone by successively adding thereto adjacent depth levels for as long as the log portions within the so expanded zone retain said selected mutual consistency.

5. A well logging method as in claim 4 in which said processing of log portions includes finding additional zones by starting with a provisional zone at each of a succession of further selected depth levels and expending each of such further provisional zones by successively adding thereto adjacent depth levels for as long as the log portions within the so expanded zone retain said selected mutual consistency.

6. A well logging method as in claim 5 in which said expanding of a provisional zone comprises provisionally adding to the provisional zone one or both of the depth levels immediately above and immediately below the provisional zone depending on the relative fit of the two last recited depth levels thereto and retaining the provisionally added depth level or levels in an expanded zone only if the well logs within the provisionally expanded zone have said respective selected mutual consistency.

7. A well logging method as in claim 5 including the step of eliminating zones which are completely included within other zones of greater depth extent.

8. A well logging method as in claim 5 including the step of locating sequences of zones in which adjacent zones overlap or are separated from each other by gaps and eliminating therefrom zones which fail to meet a selected test for optimizing the number of zones in the depth span of the sequence.

9. A well logging method as in claim 5 including locating any gaps whose vertical extent is within a selected gap limit and which are between adjacent ones of the zones and any overlaps of adjacent zones and dividing any depth levels within an overlap or a gap between the adjacent zones to thereby eliminate the overlap or gap.

10. A well logging method as in claim 9 in which said dividing of depth levels between adjacent zones comprises dividing the depth levels equally between the adjacent zones in case of an even number of depth levels to be divided and, in the case of an odd number of depth levels to be divided, including the middle one in the zone which would have better mutual consistency than the other should the middle level be added thereto.

11. A well logging method as in claim 10 in which, in the case of an odd number of depth levels within an overlap or a gap, and the case in which the middle depth level if added to each of the adjacent zones results in equally good mutual consistency, the middle level is included in the zone which has the lesser gradient and, if the two zones have the same gradient, to the zone whose depth extent is lesser.

12. A well logging method as in claim 5 including locating gaps between adjacent zones whose depth extent is greater than a selected gap limit, and for each gap exceeding the gap limit, combining portions of the logs within said gap with each other to find subsurface depth zones within each of which the logs have a respective mutual consistency which is more relaxed than said earlier recited selected mutual consistency.

13. A well logging method as in any one of claims 1-12 including converting said logs to rectangularized logs each of which is at a respective constant level within each respective zone.

14. A well logging method as in claim 13 including generating additional well logs for the common subsurface depth interval and converting each to a rectangularized additional log which has a respective constant level within each respective one of said depth zones, wherein said additional well logs have lesser vertical resolution than the first recited well logs, and producing a tangible record of selected parameters of the zones of said additional logs.

15. A well logging method comprising:
generating a number of first well logs and one or more second well logs for a common subsurface depth interval, wherein the vertical resolution of the first logs is as good as or better than that of the second logs;
combining the first logs with each other to find subsurface depth zones within each of which the first logs have a respective selected mutual consistency;
converting said first and second logs to rectangularized logs which have a respective constant measurement level within each respective one of said depth zones and producing a tangible representation of selected parameters of the rectangularized first and second logs.

16. A well logging method as in claim 15 including producing a tangible record of one or more crossplots in which a crossplot point is determined by zone parameters rather than parameters for individual depth levels of two or more of said logs.

17. A well logging method as in claim 15 in which the finding of said zones comprises starting with a provisional zone at each of a succession of selected depth levels and expanding each provisional zone by successively adding thereto adjacent depth levels for as long as the log portions within the so expanded zone retain a selected mutual consistency.

18. A well logging method as in claim 17 in which said expanding comprises adding to a provisional zone at one time one or both of the immediately adjacent depth levels depending on the relative fit thereof with respect to the provisional zone under consideration.

19. A well logging method as in claim 15 wherein said finding of zones comprises finding zones wherein the respective selected mutual consistency of one zone is different from that of another, and including producing a tangible record of the respective consistency within each respective zone.

20. A well logging method as in claim 15 in which the converting step comprises setting said respective constant measurement level for a zone in dependence not only on the average log measurement within the zone but also in independence on the manner in which the log measurements vary within the zone.

21. A well logging method comprising:
passing one or more well logging tools through a borehole traversing earth formations to generate a number of well logs for a common subsurface depth interval;
selecting mutually depth-matched portions of the logs and processing them to find subsurface depth zones within each of which the logs have a respective selected mutual consistency; and
utilizing the zones in further processing of logs for at least a portion of said common subsurface depth interval.

22. A well logging method as in claim 1, 15 or 21 including the step of testing the zones to determine if a sufficient number of the depth levels between the depth limits of a zone belong to the same zone, and rejecting zones which fail said test.

23. A well logging method as in claim 1, 15 or 21 including locating sequences of one depth level zones whose vertical extent is consistent with the vertical resolution of the tool or tools from which said logs are derived and assigning approximately half the depth levels forming said sequence to the longer zone immediately above the sequence and the remainder to the longer zone immediately below.

24. A well logging system comprising:
means for generating a number of well logs for a common subsurface depth interval; and
means for combining mutually depth-matched portions of the logs with each other to find subsurface depth zones within each of which the logs have a respective selected mutual consistency and for producing a tangible representation of selected parameters of said zones.

25. A well logging system as in claim 24 in which the means for generating well logs include one or more well logging tools passing through a borehole traversing said common subsurface depth interval.

* * * * *